United States Patent [19]

Betz et al.

[11] 4,230,736

[45] Oct. 28, 1980

[54] INTAKE LIMITING LIQUID FEED SUPPLEMENT FOR RUMINANTS

[75] Inventors: Norman L. Betz, St. Louis, Mo.; Kent J. Lanter, Belleville, Ill.; Danny L. Williams, Manchester, Mo.

[73] Assignee: Ralston Purina Company, St. Louis, Mo.

[21] Appl. No.: 970,288

[22] Filed: Dec. 18, 1978

[51] Int. Cl.³ ............................................. A23K 1/02
[52] U.S. Cl. .................................. 426/601; 426/608; 426/658; 426/807
[58] Field of Search ................... 424/2, 807, 608, 601, 424/630, 635, 658, 636; 260/408, 424, 412.3

[56] References Cited

U.S. PATENT DOCUMENTS

| 1,452,553 | 4/1923 | Gardner | 260/408 |
| 2,255,230 | 9/1941 | Ross et al. | 260/408 |
| 3,901,976 | 8/1975 | Roth et al. | 426/807 |

FOREIGN PATENT DOCUMENTS 670461 12/1938 Fed. Rep. of Germany.
825893 6/1957 Fed. Rep. of Germany.

OTHER PUBLICATIONS

Chemical Abstracts 67, 101271(c), 1967.

Primary Examiner—William F. Smith
Attorney, Agent, or Firm—Virgil B. Hill

[57] ABSTRACT

A liquid feed composition for ruminants is disclosed which is capable of controlling consumption by ruminants to a desired level without the use of equipment for this purpose. The liquid feed composition includes an intake limiting amount of chlorinated fat having a reacted chlorine content in an amount effective to limit intake or usually between about 0.2 and 7.0% by weight of said fat.

20 Claims, No Drawings

INTAKE LIMITING LIQUID FEED SUPPLEMENT FOR RUMINANTS

BACKGROUND OF THE INVENTION

This invention relates to an intake limiting liquid feed composition for ruminants and a process for employing the same in order to attain an economical and efficient means of self-feeding ruminants.

Liquid feed supplements are widely used for the feeding of cattle and have several advantages compared to dry feed supplements. One advantage is that since these feed supplements are in a liquid phase, the different components can be uniformly distributed throughout the liquid medium without difficulty. Futhermore, the liquid nature of these supplements make them economical to manufacture because of the relatively simple type of apparatus required for producing liquid feeds as compared to dry supplements.

These liquid feed supplements usually employ as a medium a carbohydrate solution such as molasses. A disadvantage, however, of liquid feed supplements is the high palatability of the molasses or liquid feed medium which causes the animals to consume excessive amounts thereby exceeding the point of most efficient feed utilization. This has necessitated the use of special equipment which is designed to "meter" the quantity of liquid feed supplement to the animal. Equipment of this tupe include "lick" wheels which are partially immersed in the feed supplement and as the animal licks the wheel it turns and carries supplement to the animal. This requirement for special equipment has, therefore, offset many of the economic advantages of manufacturing liquid feeds and a need exists for a liquid feed supplement which is self-limiting and which controls consumption by the animal to a predetermined level without special equipment for this purpose.

Copending U.S. Patent Application, Ser. No. 970,020, filed Dec. 18, 1978 by the inventors herein, discloses a composition for controlling feed supplement intake which comprises a chlorinated fat having a reacted chlorine content in an amount effective to limit intake usually between about 0.2 and 7.0% by weight, preferably with a minimum reacted chlorine level of at least about 0.5% by weight with a most preferred range of 0.9 to 1.5% by weight. It has now been determined that the use of this specific type of chlorinated fat in liquid feed supplements also controls consumption of these supplements by cattle without a requirement for special equipment.

SUMMARY OF THE INVENTION

The present invention provides an intake limiting feed composition for ruminants which controls feed intake by the ruminants and thereby provides a means of feeding the ruminants without excessive consumption of the supplement and a need for special equipment in order to meter the supplement to the animal. The liquid feed composition of the present invention comprises a liquid feed supplement medium such as a soluble carbohydrate material and a chlorinated fat having a reacted chlorine content in an amount effective to limit intake usually of between about 0.2 to 7.0% by weight, preferably with a minimum reacted chlorine level of 0.5% by weight, with a most preferred level of 0.9 to 1.5% by weight of said fat. Higher levels of reacted chlorine in a fat are attainable dependent on the amount of chlorine available for reaction or the type of fat employed and the reactive sites on the fat for chlorination. It is contemplated to include such higher levels of reacted chlorine within the scope of the present invention to the extent they can be diluted to the desired level of reacted chlorine for controlling feed intake. The chlorinated fat may be employed in the liquid feed supplement at a level effective to limit intake and typically at a level which is at least about 1.0% by weight and preferably at a level between about 2 and 8% by weight.

The chlorinated fat by itself is entirely satisfactory for intake limitation of the liquid feed supplement for ruminants although, it may also be employed in combination with other intake limiters such as diammonium phosphate, ammonium sulfate, and combinations thereof. It is desirable in some instances to include these materials, since these additional limiters also contribute to the nutritive properties of the liquid feed supplement.

An object, therefore, of the present invention is to provide for a liquid feed composition which is capable of self-limiting intake by cattle without a requirement for special equipment to control consumption by the animal.

A further object of the present invention is to provide for a liquid feed composition which consists of components which individually do not detract from the nutrient requirements of the feed supplement, while at the same time control the liquid feed supplement intake to a predetermined amount in order to allow self-feeding by the cattle.

DESCRIPTION OF THE PREFERRED EMBODIMENTS

In accordance with the present invention, a liquid feed composition has been developed which is capable of limiting intake to a predetermined amount that is necessary for proper weight maintenance of the ruminants. This predetermined amount of feed supplement intake for ruminants will accordingly vary depending on the type of animals as well as the environmental conditions under which they are maintained and is, therefore, not intended to limit the present invention although, it may be generally considered that a typical feed intake limitation for a liquid feed supplement will be less than about 6 lbs. of supplement per head per day preferably less than 4 lbs. per head per day and usually between about 2 to 4 lbs. of supplement per head of cattle per day. This amount of intake will generally be the amount which is necessary for proper weight maintenance as well as the most efficient feed utilization by the animal.

The liquid feed supplement of the present invention contains an intake limiting ingredient comprising a chlorinated fat having a reacted chlorine content in an amount effective to limit intake of the liquid supplement. The chlorinated fat employed as an intake limiting ingredient of the present invention is fully described in copending U.S. Patent Application Ser. No. 970,020, filed Dec. 18, 1978, herein incorporated by reference. The chlorinated fat may be employed in the liquid feed supplement medium in an amount effective to limit intake by ruminants and typically is employed in the liquid feed supplement at a level of at least about 1.0% by weight and preferably at a level of between about 2 and 8% by weight. While it is preferred to employ the chlorinated fat as the sole intake limiting ingredient for the liquid feed supplement of the present invention, nevertheless, it may also be used in combination with other intake limiting ingredients such as diammonium phosphate, ammonium sulfate, and combinations of these ingredients as desired.

The liquid feed supplement medium of the present invention generally comprises a liquid medium such as molasses or a liquid carbohydrate solution or a medium including materials such as sugars, pectins, dextrins, starches or other types of soluble carbohydrate materials. Molasses is typically employed as the preferred liquid feed supplement medium for the supplements of the present invention. The molasses is commonly available as an aqueous solution and has a consistency varying from a thin to a thick syrup falling within the range of 50–90 Brix. The molasses can be any of the sugar containing molasses which are commercailly available including cane or blackstrap molasses, and the like. These contain significant quantities of sugars which are an important source of organic nutrients and a carbohydrate source for the animal. Therefore, it is not intended to limit the present invention by the actual ingredients of a liquid feed supplement since besides the liquid medium as the primary ingredient, it is well known to add other materials to improve the nutritional or functional characteristics of the liquid feed supplement. Preferred procedures and ingredients for making liquid feed supplements pursuant to the present invention are described in U.S. Pat. No. 3,901,976.

In addition to the liquid feed supplement medium, it is also desirable to include a colloid material such as clay, including bentonite or attapulgite clay at typical levels between 0.5 and 5% by weight or a vegetable gum such as xanthan gum at typical levels of 0.025 to 0.015% by weight since this assists in providing a uniformly thickened liquid feed supplement with the desired viscosity. In the event clay is used in the liquid feed supplements of the present invention, it is also desirable to include a dispersing agent such as a soluble phosphate salt, for example, sodium, potassium, ammonium, tripolyphosphate, pyrophosphate and polyphosphates. This improves dispersability of the clay in the liquid feed supplement medium. Typical amounts of a dispersing agent are between 0.1 to 20% by weight of the clay.

It is further desirable and well known in the art to include ingredients in the liquid feed supplement medium which are necessary to meet the nutritional requirements of the animal including even grains and other non-soluble feed materials as well as a non-protein nitrogen source, such as biuret or urea. The exact amount of these materials which may be employed is not critical to the practice of the present invention since this will be entirely within the judgement of a person skilled in the art in order to meet the nutrient requirements of the animal. Furthermore, various minerals, vitamins, or medicaments are dispersed in the liquid feed supplement medium to produce the desired nutritive properties for the animals.

The liquid feed supplement of the present invention may also contain in addition to the acidulated fat described herein, other intake limiters such as ammonium sulfate, or diammonium phosphate. These materials all individually contribute to the nutritive properties of the liquid feed supplement and typical amounts which may be employed include 0.1 to 5% of ammonium sulfate, and 0.1 to 5% of diammonium phosphate. The liquid feed supplement of the present invention may be fed to ruminants directly and thereby self-limit intake to the ruminants without a requirement for special equipment in order to meter a designated amount of supplement to the animal. It is also within the scope of the present invention that the liquid feed supplement described herein may be mixed with other dry feed supplements or various roughage sources which can then be fed to the cattle.

For the purposes of full and complete disclosure, the following Examples are set forth as illustrative rather than limiting embodiments thereof.

EXAMPLE 1

A liquid feed supplement was prepared having the following formula and containing a chlorinated fat which was prepared by the following procedure. 2,354 lbs. of bleachable fancy tallow was mixed with 235 lbs. (10% by weight) of concentrated hycrochloric acid (36% HCL). This mixture was heated for 4 hours and 5 minutes until a temperature of 127° C. was reached. The fat was held at this temperature for an additional 3 hours and the pH of the fat adjusted to 5.2 with sodium hydroxide solution. Analysis of the chlorinated fat by the procedure set forth in U.S. Ser. No. 970,020, filed Dec. 18, 1978, herein incorporated by reference indicated a level of 1.36% reacted chlorine in the fat.

| Ingredient | % by Weight |
| --- | --- |
| Water | 10.0 |
| Molasses | 63.5 |
| Ammonium Polyphosphate | 6.4 |
| Attapulgite Clay | 1.5 |
| Urea | 9.4 |
| Animal Fat | 1.0 |
| Calcium Carbonate | 4.0 |
| Vitamins and Minerals | .2 |
| Chlorinated Fat | 4.0 |

The above identified liquid supplement was prepared pursuant to the general procedure described in U.S. Pat. No. 3,901,976. The animal fat and chlorinated fat was added to the mixed supplement together with the vitamins and minerals and mixed additionally for several minutes.

The above liquid supplement was fed to two groups of cows in two separate experiments. Each group of 21 cows was fed the above supplement for 69 days. The supplements were available to the cattle in an open container on a free choice basis. Average consumption was determined to be 0.77 lbs./head/day for feeding Trial No. 1 and 1.47 lbs./head/day for Trial No. 2.

Although the present invention has been described with regard to various specific embodiments, it is understood that certain modifications and variations may be made without departing from the scope of the instant invention. Furthermore, such reasonable variations and modifications are considered to be within the spirit and scope of the Claims appended thereto.

What is claimed is:

1. An intake limiting liquid feed supplement for ruminants comprising a liquid carbohydrate medium containing an intake limiting amount of a chlorinated fat having a reacted chlorine content of between about 0.2 and 3.7% by weight of said fat.

2. The liquid feed supplement of claim 1 wherein said fat has a reacted chlorine content of between about 0.9 and 3.7% by weight.

3. The liquid feed supplement of claim 1 wherein said fat has a reacted chlorine content of between about 0.9 and 1.5% by weight.

4. The liquid feed supplement of claim 1 wherein the amount of said chlorinated fat effective to limit intake is at least about 1.0% by weight of said supplement.

5. The liquid feed supplement of claim 1 wherein the amount of said chlorinated fat effective to limit intake is between about 2 to 8% by weight of said supplement.

6. The liquid feed supplement of claim 1 wherein the liquid carbohydrate medium is molasses.

7. The liquid feed supplement of claim 1 wherein an intake limiting amount of a material selected from the group consisting of diammonium phosphate, ammonium sulfate, and combinations thereof is included.

8. The liquid feed supplement of claim 7 wherein the level of ammonium sulfate is 0.1 to 5% by weight of said supplement, and the level of diammonium phosphate is 0.1 to 5% by weight of said supplement.

9. An intake limiting liquid feed supplement for ruminants comprising a liquid carbohydrate medium containing an intake limiting amount of a chlorinated fat having a reacted chlorine content in an amount effective to limit intake of said supplement but not exceeding about 3.7% by weight of said fat.

10. An intake limiting liquid feed supplement for ruminants comprising molasses, a dispersing agent, and a colloid material, said supplement including an intake limiting amount of chlorinated fat having a reacted chlorine content of between about 0.2 to 3.7% by weight of said fat.

11. The liquid feed supplement of claim 10 wherein the reacted chlorine content is between about 0.9 and 3.7% by weight.

12. The liquid feed supplement of claim 10 wherein the dispersing agent is employed at a level between about 0.1 to 20% by weight of said colloid material.

13. The liquid feed supplement of claim 10 wherein the colloid material is employed at a level of between about 0.5 to 5% by weight of said supplement.

14. The liquid feed supplement of claim 10 which includes 0.1 to 5% by weight of said supplement of ammonium sulfate, and 0.1 to 5% by weight of said supplement of diammonium phosphate.

15. An intake limiting liquid feed supplement for ruminants comprising molasses, a dispersing agent, and a colloid material, said supplement including an intake limiting amount of a chlorinated fat having a reacted chlorine content in an amount effective to limit intake of said supplement but not exceeding 3.7% by weight of said fat.

16. A method of producing a self-limiting liquid feed supplement for ruminants comprising forming a liquid feed supplement medium by mixing an intake limiting amount of a chlorinated fat, said fat having a reacted chlorine content of between about 0.2 and 3.7% by weight of said fat with a liquid carbohydrate medium.

17. The method of claim 16 wherein the intake limiting amount is at least about 1.0% by weight of said supplement.

18. The method of claim 16 wherein the liquid carbohydrate medium is molasses.

19. The method of claim 16 wherein the reacted chlorine content is between about 0.9 to 3.7% by weight.

20. The method of claim 16 wherein the reacted chlorine content is between about 0.9 to 1.5% by weight.

* * * * *

UNITED STATES PATENT AND TRADEMARK OFFICE
CERTIFICATE OF CORRECTION

PATENT NO. : 4,230,736
DATED : October 28, 1980
INVENTOR(S) : Norman L. Betz et al It is certified that error appears in the above—identified patent and that said Letters Patent is hereby corrected as shown below:

Column 1, line 29
"tupe" should read "type"

Column 3, line 32
"0.015%" should read "0.15%"

Signed and Sealed this

Sixteenth Day of June 1981

[SEAL]

Attest:

RENE D. TEGTMEYER

Attesting Officer   Acting Commissioner of Patents and Trademarks